(12) United States Patent
Terry et al.

(10) Patent No.: US 11,624,467 B2
(45) Date of Patent: Apr. 11, 2023

(54) FUSION OUTLET ISOLATION VALVE WITH THERMOPLASTIC OVERMOLDING

(71) Applicant: NIBCO Inc., Elkhart, IN (US)

(72) Inventors: Andrew J. Terry, Sturbridge, MA (US); Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 180 days.

(21) Appl. No.: 17/115,866

(22) Filed: Dec. 9, 2020

(65) Prior Publication Data

US 2022/0178483 A1 Jun. 9, 2022

(51) Int. Cl.
| | |
|---|---|
| *F16L 47/24* | (2006.01) |
| *F16K 27/06* | (2006.01) |
| *B29C 45/14* | (2006.01) |
| *F16L 47/28* | (2006.01) |
| *F16L 41/16* | (2006.01) |
| *F16L 41/08* | (2006.01) |
| *F16L 47/02* | (2006.01) |

(52) U.S. Cl.
CPC .............. *F16L 47/24* (2013.01); *B29C 45/14* (2013.01); *F16K 27/067* (2013.01); *F16L 41/084* (2013.01); *F16L 41/16* (2013.01); *F16L 47/02* (2013.01); *F16L 47/28* (2013.01)

(58) Field of Classification Search
CPC ...... F16K 27/067; F16K 5/0657; F16L 41/16; F16L 41/084; F16L 47/02; F16L 47/28; F16L 47/24; B29C 45/14; B29C 45/00
See application file for complete search history.

(56) References Cited

U.S. PATENT DOCUMENTS

| | | | | |
|---|---|---|---|---|
| 2,512,009 A | * | 6/1950 | Louise .................... | F16L 41/16 |
| | | | | 285/179 |
| 2,881,010 A | * | 4/1959 | Bouma ................... | B08B 9/032 |
| | | | | 251/146 |
| 3,272,471 A | * | 9/1966 | McCullah ............... | F16L 41/16 |
| | | | | 251/146 |
| 3,642,252 A | * | 2/1972 | Phillips ................... | F16L 41/14 |
| | | | | 285/212 |
| 4,093,280 A | * | 6/1978 | Yoshizawa ............. | F16L 47/24 |
| | | | | 285/915 |
| 4,553,562 A | * | 11/1985 | Nakada ................. | F16K 5/0657 |
| | | | | 251/366 |

(Continued)

FOREIGN PATENT DOCUMENTS

| | | | | | |
|---|---|---|---|---|---|
| AT | 397845 B | * | 5/1994 | ............. | F16L 47/24 |
| AT | 410708 B | * | 5/2003 | ............. | F16L 47/16 |

*Primary Examiner* — David Colon-Morales
(74) *Attorney, Agent, or Firm* — Price Heneveld LLP (57) ABSTRACT

An isolation valve unit with a fusion outlet including a valve body comprised of a metal, such as brass, and having at least two ports, at least one of the ports including an overmolded thermoplastic end surrounding and enclosing the port from which the fusion outlet extends. In one embodiment, the thermoplastic end is composed of a PP-RCT material and is securely formed over the port by way of an over molding technique. The valve unit further includes a ball valve accommodated within the valve body and a handle for actuating the ball valve. The isolation valve unit is configured to couple to a larger polymeric pipe and to control the flow of fluids in a plumbing system via actuation of the ball valve.

19 Claims, 11 Drawing Sheets

(56) References Cited

U.S. PATENT DOCUMENTS

| | | | | |
|---|---|---|---|---|
| 4,894,521 | A * | 1/1990 | Evans | B29C 66/112 |
| | | | | 285/21.2 |
| 5,366,257 | A * | 11/1994 | McPherson | F16L 47/32 |
| | | | | 285/392 |
| 5,782,162 | A | 7/1998 | Lanteigne et al. | |
| 6,517,116 | B1 * | 2/2003 | Cassaro | F16L 47/28 |
| | | | | 285/423 |
| 7,621,295 | B2 * | 11/2009 | Reck | F16K 11/0876 |
| | | | | 122/13.3 |
| 7,681,596 | B2 * | 3/2010 | Reck | F16K 11/22 |
| | | | | 137/883 |
| 8,220,126 | B1 | 7/2012 | Yunk et al. | |
| 8,360,092 | B2 * | 1/2013 | Tappe | F16K 5/0689 |
| | | | | 251/315.1 |
| 8,844,111 | B1 | 9/2014 | Yunk, Jr. et al. | |
| 8,844,981 | B1 * | 9/2014 | Crompton | F16L 37/0915 |
| | | | | 285/315 |
| 10,036,481 | B2 * | 7/2018 | Reck | F16K 27/067 |
| 10,641,398 | B2 * | 5/2020 | Rizzio | F16K 5/0657 |
| 2004/0235683 | A1 | 11/2004 | Moffett | |
| 2005/0173002 | A1 * | 8/2005 | Simendinger | F16K 5/0657 |
| | | | | 137/375 |
| 2008/0098886 | A1 | 5/2008 | Lindsten et al. | |
| 2010/0108147 | A1 | 5/2010 | Renard | |
| 2015/0308576 | A1 * | 10/2015 | Yelkin | B29C 45/261 |
| | | | | 251/315.16 |
| 2015/0330541 | A1 * | 11/2015 | McCoy | B29C 66/5344 |
| | | | | 285/288.1 |
| 2020/0240530 | A1 * | 7/2020 | Gantz | F16K 5/0626 |

* cited by examiner

FUSION OUTLET ISOLATION VALVE WITH THERMOPLASTIC OVERMOLDING

BACKGROUND OF THE INVENTION

This invention relates generally to isolation valves, and, more particularly, to an isolation valve unit having a fusion outlet port with an overmolded thermoplastic end.

Figure 1:
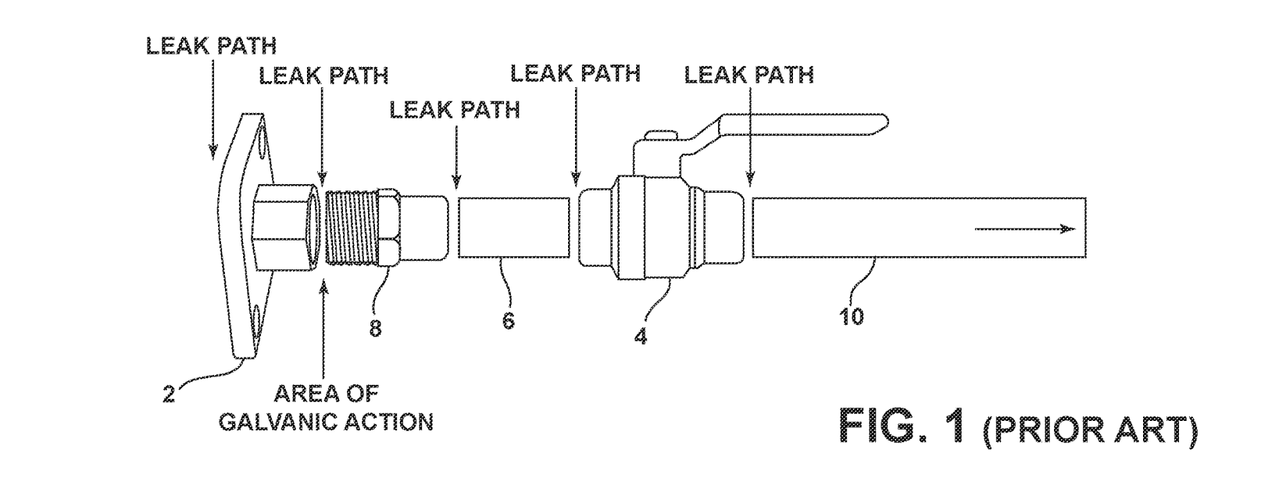
FIG. 1 is a perspective side view of one embodiment of a conventional piping and valve.

Isolation valves are well known and are traditionally used in plumbing and heating applications to control the flow of water or other fluid to and from an in-line appliance or piece of equipment for purposes of maintenance, replacement or repair. For example, as shown in FIG. 1, a ball valve used in a plumbing and heating application includes a separate flange 2, a conventional ball valve 4, and a copper nipple 6 and copper adapter 8 that connect the flange 2 to the conventional ball valve 4. The ball valve 4 is attached to the plumbing or heating system with copper tubing 10. The in-line appliance (not shown) may be attached to the flange 2.

Figure 2:
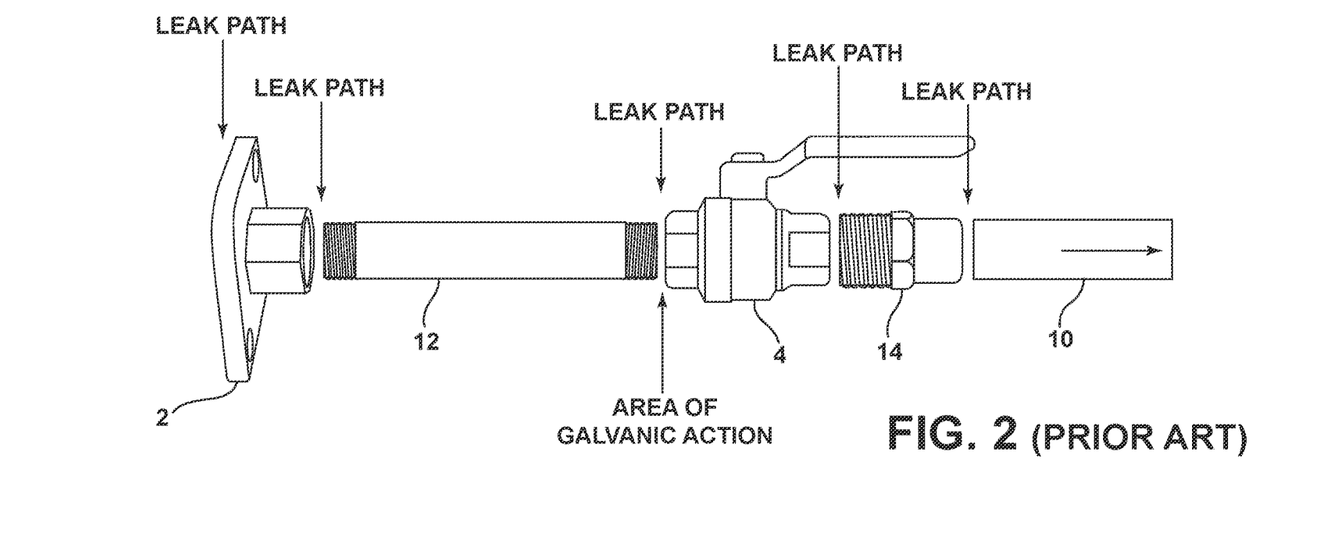
FIG. 2 is a perspective side view of another embodiment of a conventional piping and valve system.

Alternatively, a nipple 12 has been used to connect the flange 2 to the ball valve 4, and an adapter 14 has been used to connect the ball valve 4 to the copper tubing 10, as shown in FIG. 2. As shown in FIGS. 1 and 2, in the conventional methods, there are several potential leak paths. Also, there are areas of galvanic action between dissimilar metals. Further, installation of the flange, the nipples, and the adapters in this type of configuration is time consuming and expensive.

In an effort to overcome some of the disadvantages associated with metal valves and piping, some plumbing fixtures (e.g., valves, pipes, and/or fittings) may be made of a plastic material. Plastic plumbing can resist corrosion, is generally nontoxic and approved for carrying potable water, and may further eliminate any rusty or metallic taste in drinking water that metal pipes can leave. Because they do not corrode or rust and are not subject to scaling, plastic pipes are less likely to develop "build up" on the inner surfaces, which may be common to metal plumbing pipes. As such, plastic plumbing may allow water to flow unhindered for a long period of time.

Despite its benefits, the use of plastic plumbing may be limited. For example, in instances in which the control and delivery of high water pressure is desired, plastic plumbing fixtures may fail. For example, in certain installations (e.g., a multistory building), water pressure can be extreme. Unlike conventional metal plumbing, plastic plumbing, specifically plastic valves, may be insufficient and unable to withstand the high pressure without failure.

SUMMARY OF THE INVENTION

One aspect of the present invention is a fluid isolation valve with a fusion outlet coupling. The fluid isolation valve has a metal valve body with a first port, a second port, and a fluid passageway between the ports. The fluid isolation valve includes an overmolded thermoplastic polymer that surrounds and encloses a distal portion of one of the ports. The distal portion of that port includes ribs formed on an outer surface, with at least one of the ribs being substantially parallel with a longitudinal axis of the port to prevent the overmolded end from rotating about the distal portion of the port. The fluid isolation valve has a flow diversion device disposed within the valve body between the first and second ports to control the flow of fluid within the fluid passageway. The overmolded thermoplastic polymer extends beyond the ribs to a multi-tiered fusion coupling with a wider tier having a concave surface.

Another aspect of the present invention is a fluid isolation valve with a metal body having a first port, a second port, and a fluid passageway between the ports. The fluid isolation valve has an overmolded thermoplastic polymer end surrounding a distal portion of one of the ports. A flow diversion device is disposed in the valve body between the ports. The distal end of the port that is overmolded has at least one protrusion that extends substantially parallel to a longitudinal axis of the port. That protrusion is configured to prevent the overmolded end from rotating about the distal portion of the port. The overmolded thermoplastic polymer extends beyond the protrusion to a multi-tiered coupling with at least one tier having a concave surface.

Yet another aspect of the present invention is a coupling of a fluid isolation valve to a polymeric pipe. The polymeric pipe has a generally cylindrical outer wall with an opening in the outer wall. The fluid isolation valve has a metal valve body with a first port, a second port, and a fluid passageway between the ports. A flow diversion device is disposed in the valve body between the ports. An overmolded thermoplastic polymer end surrounds a distal portion of the first port. The distal portion of the first port has at least one protrusion extending therefrom in a direction substantially parallel to a longitudinal axis of the first port. The overmolded thermoplastic polymer extends beyond the protrusion to a multi-tiered coupling with at least one concave surface. The concave surface will conform to the generally cylindrical outer wall of the polymeric pipe when the fluid passageway of the metal valve body is aligned with the opening in the outer wall of the polymeric pipe.

These and other features, advantages, and objects of the present invention will be further understood and appreciated by those skilled in the art by reference to the following specification, claims, and appended drawings.

DETAILED DESCRIPTION

Figure 4:
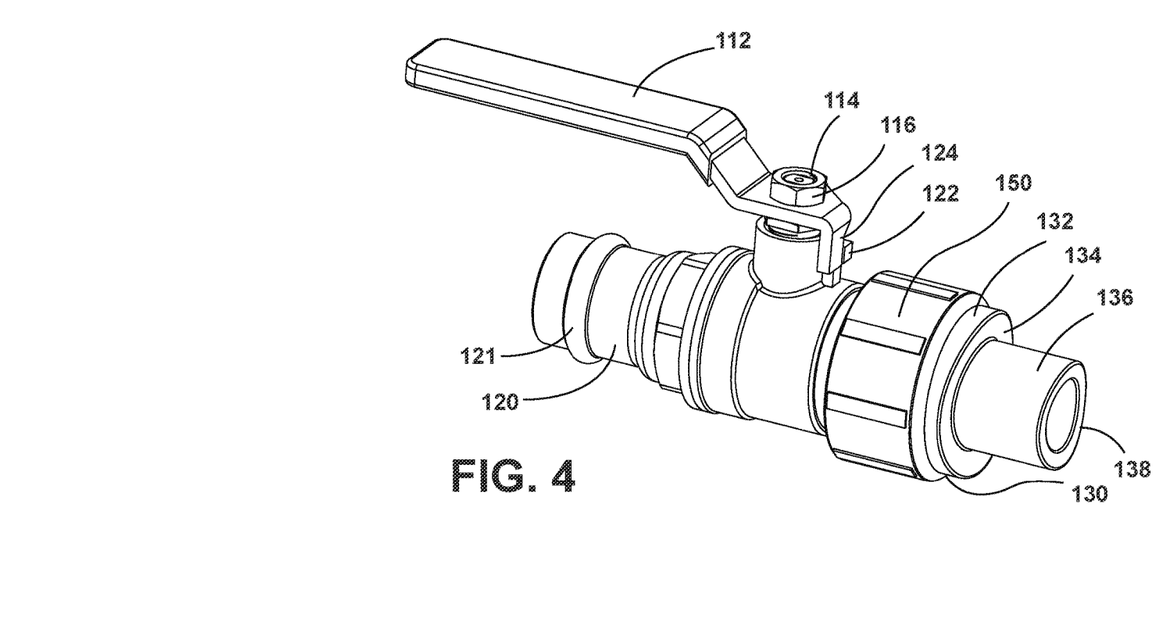
FIG. 4 is a perspective side view of the embodiment of an isolation valve shown in FIG. 3, rotated.
Figure 5:
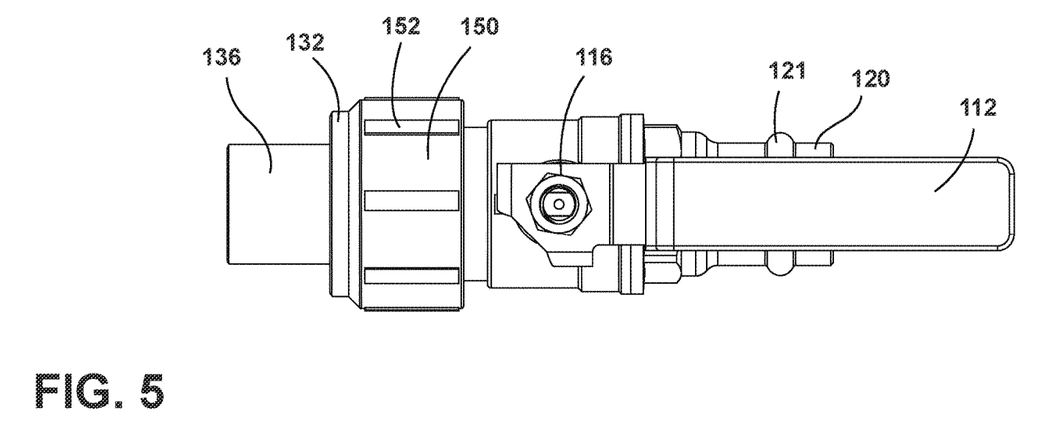
FIG. 5 is a top view of the isolation valve shown in FIG. 3.
Figure 6:
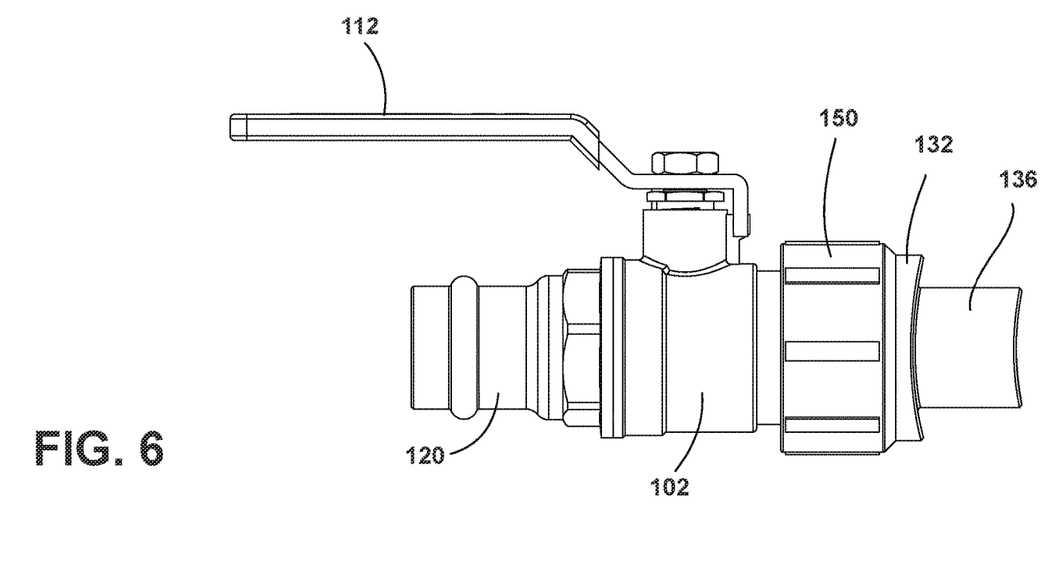
FIG. 6 is a side view of the isolation valve of FIG. 3, rotated as generally oriented in FIG. 4.
Figure 7:
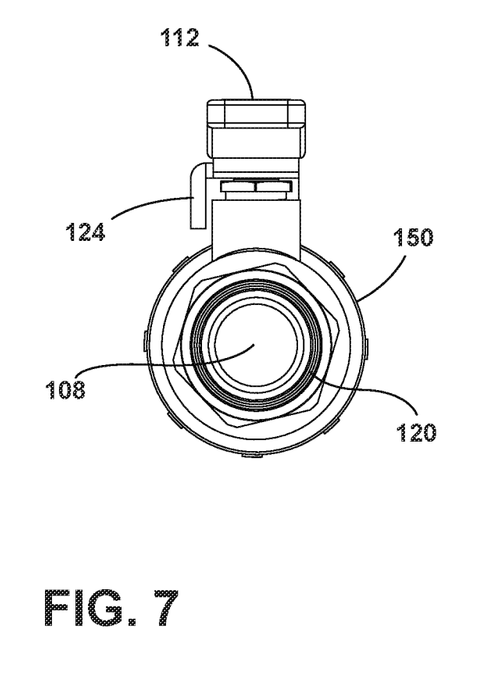
FIG. 7 is an end view of one port of the isolation valve shown in FIG. 3.
Figure 8:
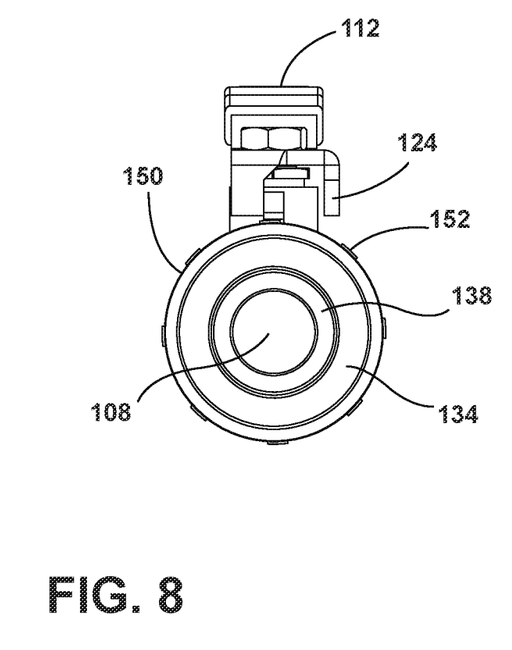
FIG. 8 is an end view of the other port of the isolation valve shown in FIG. 3.
Figures 9, 10:
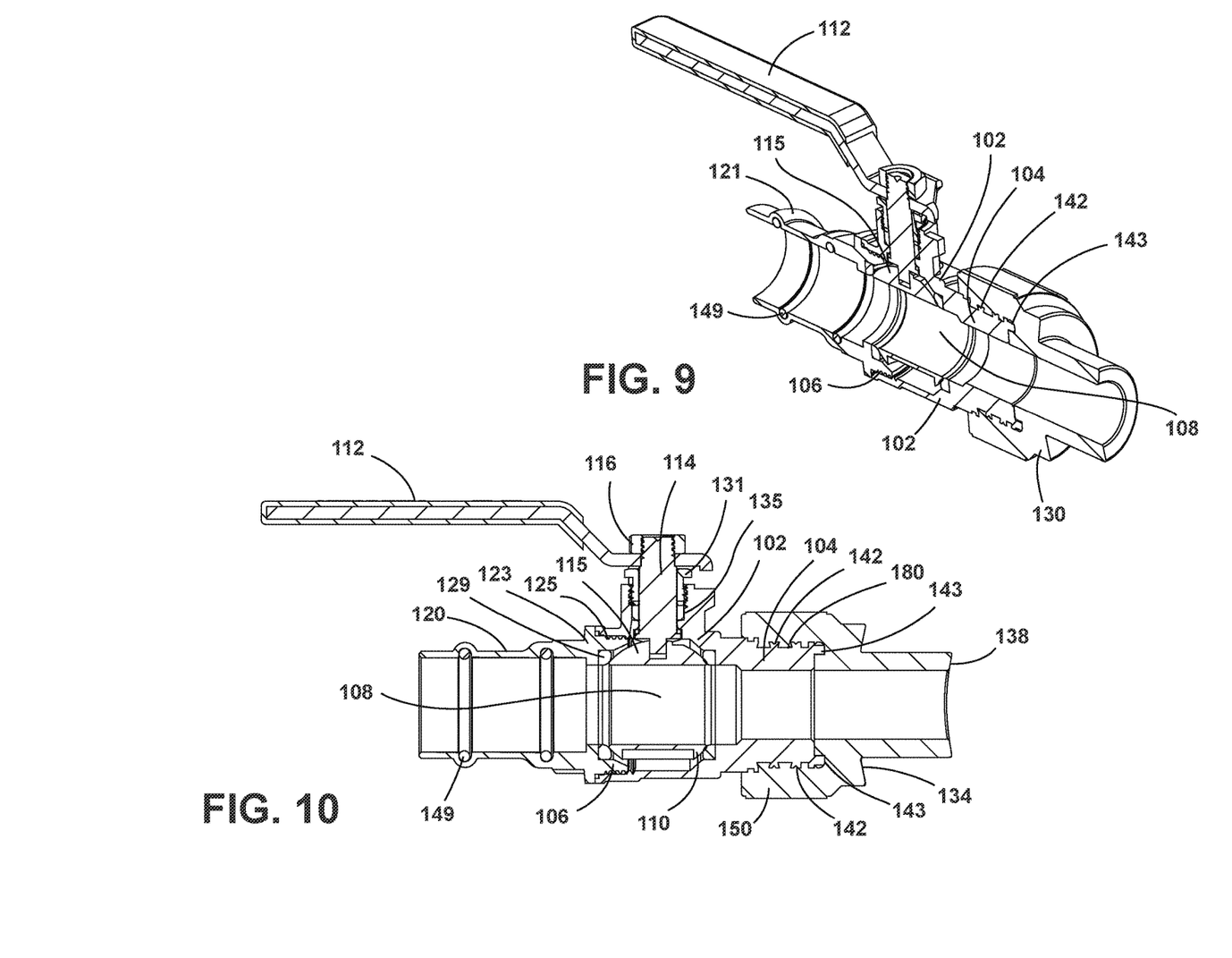
FIG. 9 is a perspective cut-away side view of the isolation valve of FIG. 3 rotated as generally oriented in FIG. 4.
FIG. 10 is a cut-away side view of the isolation valve of FIG. 3, as oriented in FIG. 4.
Figure 11:
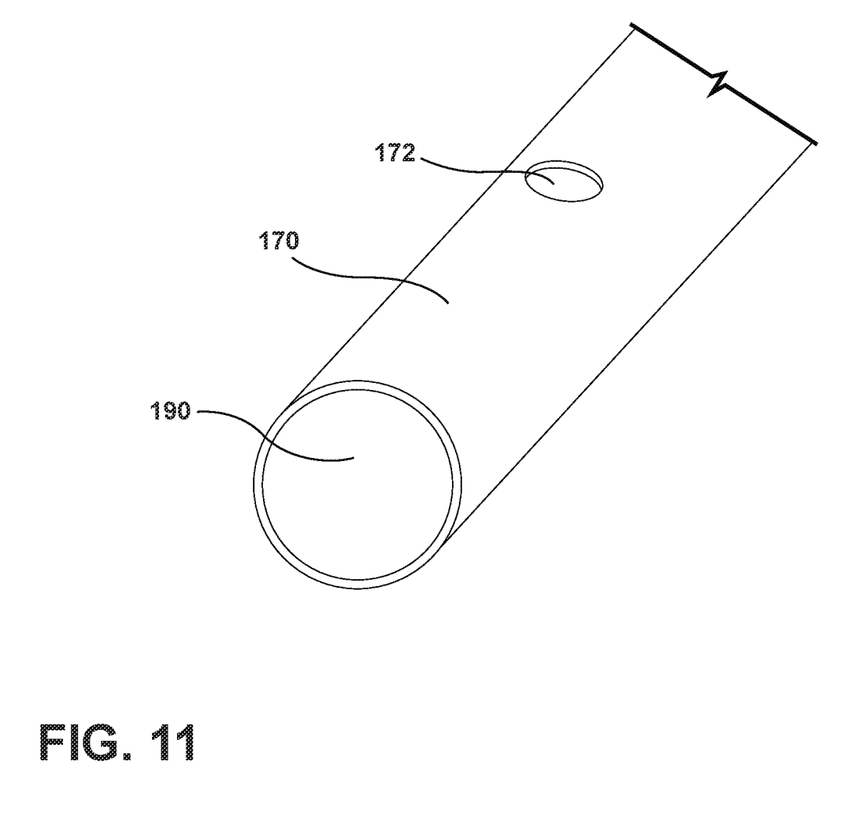
FIG. 11 is a partial front perspective view of a polymeric pipe.

For purposes of description herein, the terms "upper," "lower," "right," "left," "rear," "front," "vertical," "horizontal," and derivatives thereof shall relate to the invention as oriented in FIGS. 4, 6, and 10. However, it is to be understood that the invention may assume various alternative orientations and step sequences, except where expressly specified to the contrary. Moreover, it is to be understood that some of the other Figures show the invention in different orientations. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment.

By way of overview, the present invention is generally directed to an isolation valve including a valve body comprised of a metal, such as brass, and having at least two ports. At least one of the ports has an overmolded thermoplastic end surrounding and enclosing the port. The overmolded thermoplastic end terminates in a fusion outlet coupling for connecting into the cylindrical wall of a polymeric pipe. In one embodiment, the thermoplastic end is composed of a polypropylene random copolymer with modified crystallinity and temperature resistance (PP-RCT) material and is securely formed over the port by way of an over molding technique. The valve unit further includes a ball valve accommodated within the valve body and a handle for actuating the ball valve. The isolation valve unit is configured to control the flow of fluids in heating and plumbing systems by way of the ball valve.

Figure 12:
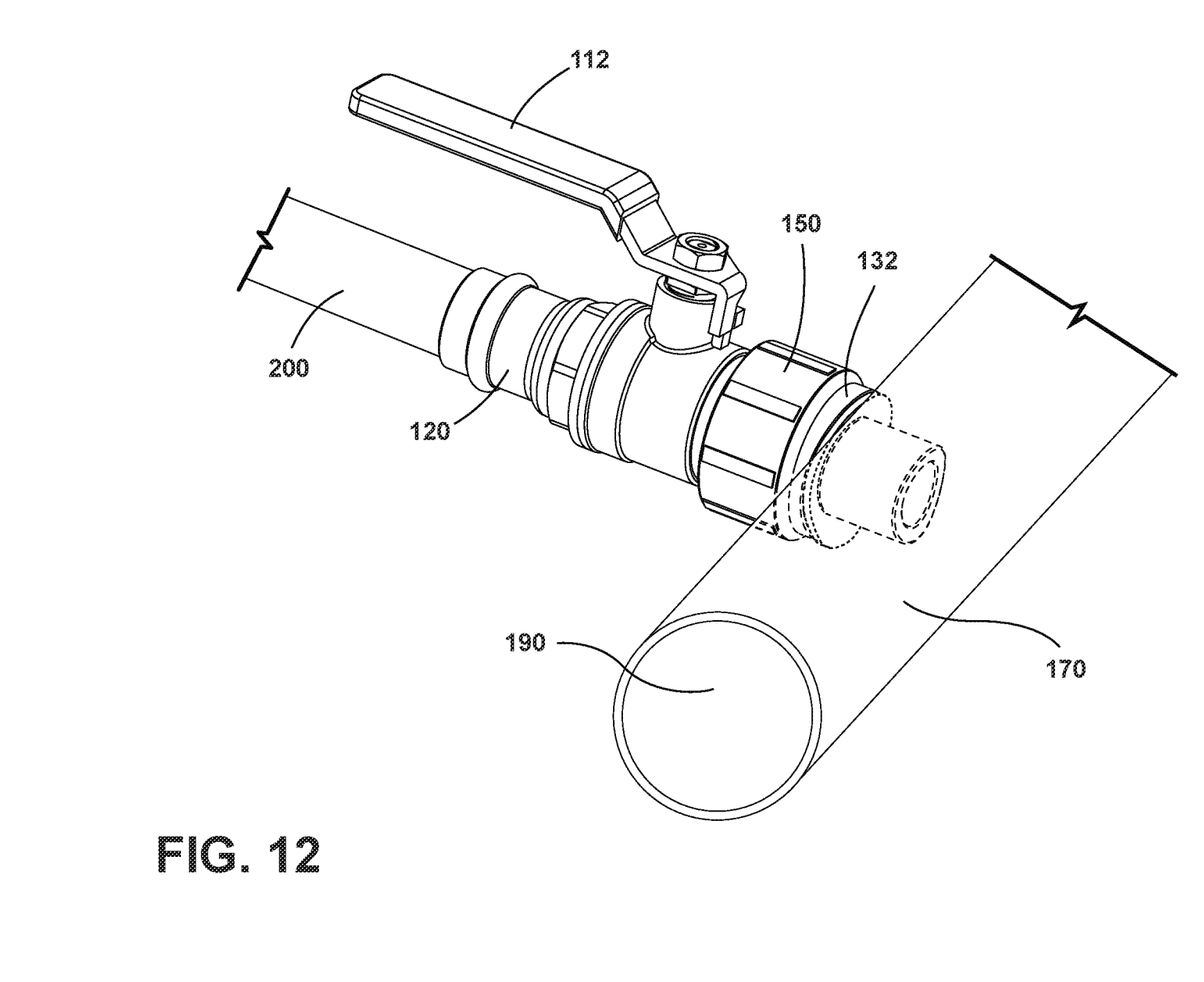
FIG. 12 is a partial cross-sectional view of the polymeric pipe of FIG. 11 coupled to the isolation valve of FIG. 3, rotated as generally oriented in FIG. 4.

One embodiment of the inventive isolation valve 100 is shown in FIGS. 3-10 and 12. The isolation valve 100 includes a valve body 102 having a first port 104 and a second port 106. The valve body 102 includes a fluid passageway 108 between the first port 104 and the second port 106. Fluid passageway 108 provides fluid communication between the tubing 200 entering the second port 106 and the fusion outlet 130 on the first port 104, as illustrated in FIG. 12.

The isolation valve 100 further includes a flow diversion device 110 for controlling the fluid flow within the fluid passageway 108 between the first port 104 and second port 106. The flow diversion device 110 is configurable between at least a first configuration in which fluid is permitted to freely flow between the first port 104 and second port 106 and a second configuration in which the flow diversion device 110 restricts the fluid passageway 108 and prevents fluid flow between the first port 104 and the second port 106. The flow diversion device 110 is configurable between the first and second configurations via an actuator 112. The actuator 112 can be coupled to a stem 114 via a nut 116. The flow diversion device 110 can be a ball 115, as shown in the illustrated embodiment. Other types of flow diversion device(s) 110 can be used. The actuator 112 can be a lever, handle, knob, or any other device that can move the flow diversion 110 directly or indirectly.

The first port 104 and second port 106 of valve body 102 can be part of a unitary piece. For example, the valve body 102 with first port 104 and second port 106 can be cast, forged, or machined from a metallic material, such as brass. Since plumbing and/or heating systems may include metal piping, such as copper or brass, the valve body 102 reduces/prevents the occurrence of electrolysis and galvanic action at the junction of the isolation valve 100 and tubing 200. In some embodiments, one of the ports can be releasably coupled to the valve body 102 via threaded engagement or the like. For example, as illustrated in FIG. 10, the second port 106 includes a threaded end 125 that couples to the threaded fitting 123.

In the illustrated embodiment, the actuator 112 is affixed to the stem 114 such that movement of the actuator 112 repositions the ball 115 to alter the fluid passageway 108 of the isolation valve 100. As shown, the ball 115 defines at least a first opening generally equal in diameter to the inner diameter of the first port 104 and second port 106 and the fluid passageway 108, as illustrated in FIG. 10. Thus, the fluid passageway 108 is unobstructed when the ball 115 is in an open position. When the actuator 112 is moved to the second position, the ball 115 blocks the fluid passageway 108. The ball 115 can be sealed in the fluid passageway 108 by seals 129. As shown in FIG. 10, the ball 115 may be actuated with a stem 114 that is sealed with a stem seal 135, adjustable packing gland 131, and/or other seals and couplings. The movement of the actuator 112 can be restricted by the interaction of the extension 124 on actuator 112 and shoulder 122 on valve body 102.

The distal portion of the first port 104 is enclosed and encapsulated by an overmolded portion 150. While the illustrated embodiments show that the distal end of the first port 104 is fully enclosed and encapsulated, the overmolded portion 150 can enclose and encapsulate a portion of the distal end of first port 104. The overmolded portion 150 is composed of a thermoplastic polymer, such as polypropylene random (PP-R) and/or polypropylene random copolymer with modified crystallinity and temperature resistance (PP-RCT). The thermoplastic polymer is formed over the first port 104. The polymeric material extends beyond the first port 104 to form a fusion outlet 130. The fusion outlet 130 includes a larger first tier 132 with a concave surface 134 and a smaller second tier 136 with a concave surface 138.

The fusion outlet 130 is designed to be coupled to a polymeric pipe 170, as illustrated in FIG. 12. The polymeric pipe 170 is larger in diameter than the fluid passageway 108 of the valve body 102.

The polymeric pipe 170 includes an opening 172 which has approximately the same diameter as the diameter of the second tier 136 of fusion outlet 130. The opening 172 is typically cut into the polymeric pipe 170 during installation of the fusion outlet 130 to the polymeric pipe 170. The fusion outlet 130 and/or the area around opening 172 of the polymeric pipe 170 can be heated before the fusion outlet 130 is coupled to the polymeric pipe 170. For example, the concave surface 134 and second tier 136 of the isolation valve 100 can be heated. The inside diameter of opening 172 and the area surrounding opening 172 on the polymeric pipe 170 can also be heated. The fusion outlet 130 is then coupled to the polymeric pipe 170 by the insertion of the second tier 136 through opening 172 in polymeric pipe 170. Once the heated materials are cooled, the coupling of the fusion outlet 130 to polymeric pipe 170 is completed.

The concave surface 134 of the first tier 132 of fusion outlet 130 is designed to generally conform to the exterior surface of the polymeric pipe 170 surrounding opening 172. Thus, the concave surface 134 of first tier 132 can be shaped depending upon the size of the first tier 132, the size of the fluid passageway 108, and/or the size of the polymeric pipe 170 to which the fusion outlet 130 is being coupled. For example, a concave surface can be differently shaped depending upon whether the coupling is being done to a 1-, 2-, 3-, 4-inch, etc. polymeric pipe 170.

When the fusion outlet 130 is coupled to the polymeric pipe 170, the fluid passageway 108 of the isolation valve 102 should be generally centered within the opening 172 in the polymeric pipe 170. A portion of the second tier 136 of fusion outlet 130 can extend into the interior of the polymeric pipe 170, as shown in FIG. 12. The length of the second tier 136 can be altered to reduce the amount of the second tier 136 that is present in the fluid passageway 190 of the polymeric pipe 170. Similarly, the second tier 136 can have a concave surface 138 to reduce the interruption of the fluid passageway 190 in the polymeric pipe 170.

While the illustrated embodiments illustrate a two-tiered fusion outlet 130, three or more tiers can be used for the fusion outlet 130. For example, the fusion outlet 130 could have multiple tiers with concave surfaces, configured to fit into different sized openings in the polymeric pipes 170 and/or different sized polymeric pipes 170. Thus, a single fusion outlet 130 can be used for fusion coupling to different sized polymeric pipes 170 and/or different sized openings in the polymeric pipe 170.

The first port 104 includes a plurality of protrusions or ribs 142 formed on the exterior surface of the first port 104. The ribs 142 may extend along the circumference of the first port 104 and may be substantially orthogonal to a longitudinal axis X of the first port 104. In some embodiments, one or more of the ribs 142 may extend along the outer surface of the first port 104 and may be substantially parallel with the longitudinal axis X. The inclusion of a rib 142 that is substantially parallel to the longitudinal axis X may prevent the overmolded portion 150 from rotating about the first port 104 once coupled thereto.

The overmolded portion 150 encapsulates and surrounds at least the ribs 142 along the outer surface of the first port 104. In particular, portions of the thermoplastic material fill in the channels 180 formed in between adjacent ribs 142, thereby providing a secure engagement between the overmolded portion 150 and the first port 104 of valve body 102. In some embodiments, two adjacent ribs 142 may each have an undercut, thereby forming a channel that tapers in width from the base of the channel to the terminating edges of the channel. In particular, the undercut may generally represent a trapezoid, dovetail joint, or partial dovetail joint. The ribs 142 can include entire ribs 142 or portions of ribs 142 that are generally parallel to longitudinal axis X of the first port 104. Accordingly, the tapered channel may enhance the engagement between the overmolded portion 150 and the first port 104, ensuring the overmolded portion 150 securely couples to the first port 104 and resists separation of the overmolded portion 150 from the first port 104. The overmolded portion 150 can have protrusions 152 on the exterior surface. The protrusions 152 can be generally parallel to longitudinal axis X of the first port 104.

Figure 13:
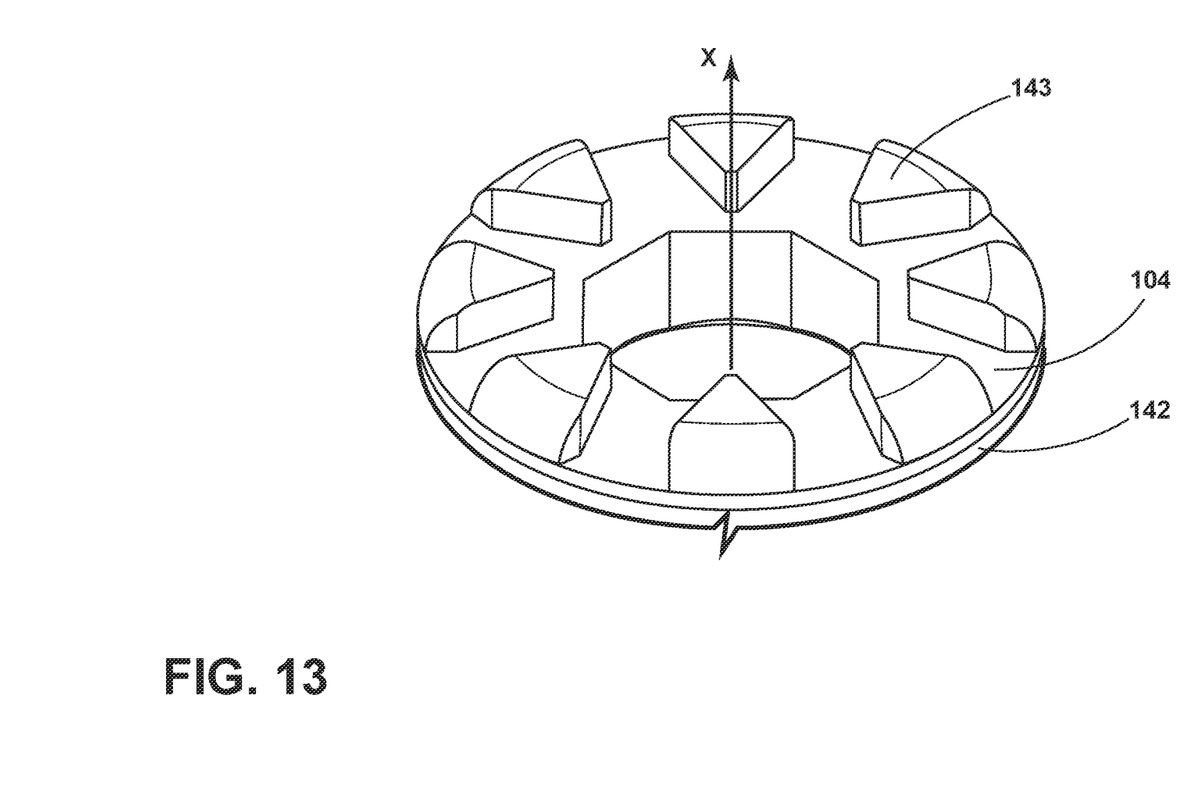
FIG. 13 is a partial perspective view of a port illustrating protrusions to be encapsulated by an overmolded thermoplastic.

FIG. 13 is a partial perspective view of the first port 104 without the thermoplastic material overmolded thereto, so as to more clearly illustrate some of the features on the outer surface of the first port 104. In addition to including one or more ribs 142 formed on an outer surface thereof, the first port 104 may further include one or more protrusions 143 extending from the distal portion and may be spaced equidistant along a circumference of the distal portion of the first port 104. The protrusions 143 may generally extend in a direction that is substantially parallel to the longitudinal axis X of the first port 104, such that the protrusions 143 are configured to prevent the overmolded portion 150 from rotating about the distal portion of the first port 104 once coupled thereto.

A large number of thermoplastic polymeric materials are contemplated as being useful in the overmolding of one or more portions of the isolation valve 102. The thermoplastic materials may be employed alone or in blends. Suitable thermoplastic materials include, but are not limited to, PP-R, PP-RCT, rubber modified polyolefins, metallocene, polyether-ester block copolymers, polyether-amide block copolymers, thermoplastic based urethanes, copolymers of ethylene with butene and maleic anhydride, hydrogenated maleic anhydride, polyester polycaprolactone, polyester polyadipate, polytetramethylene glycol ether, thermoplastic elastomer, polypropylene, vinyl, chlorinated polyether, polybutylene terephthalate, polymethylpentene, silicone, polyvinyl chloride, thermoplastic polyurethane, polycarbonate, polyurethane, polyamide, polybutylene, polyethylene and blends thereof.

Figure 16:
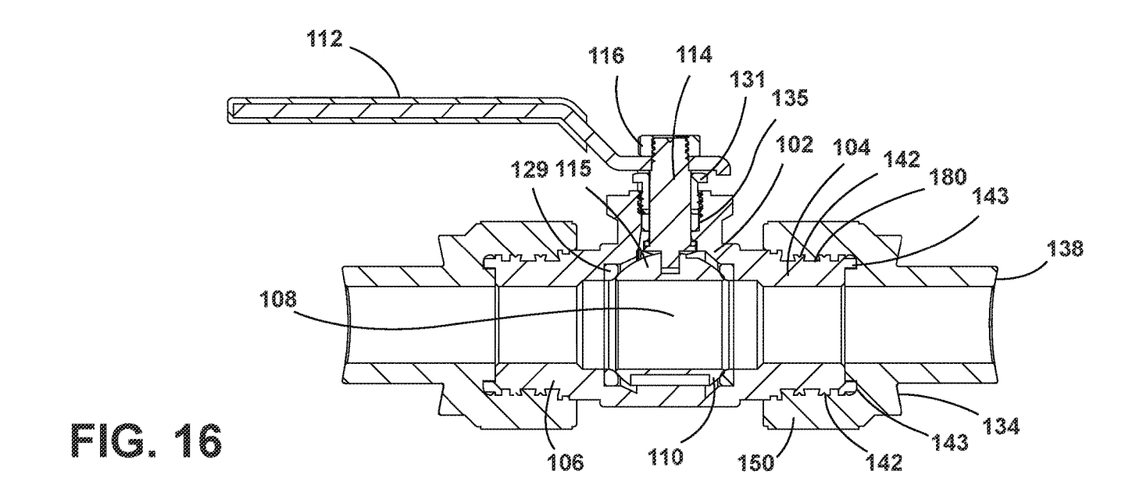
FIG. 16 is a cutaway side view of the isolation valve with both parts being encapsulated by an overmolded thermoplastic material.
Figure 17:
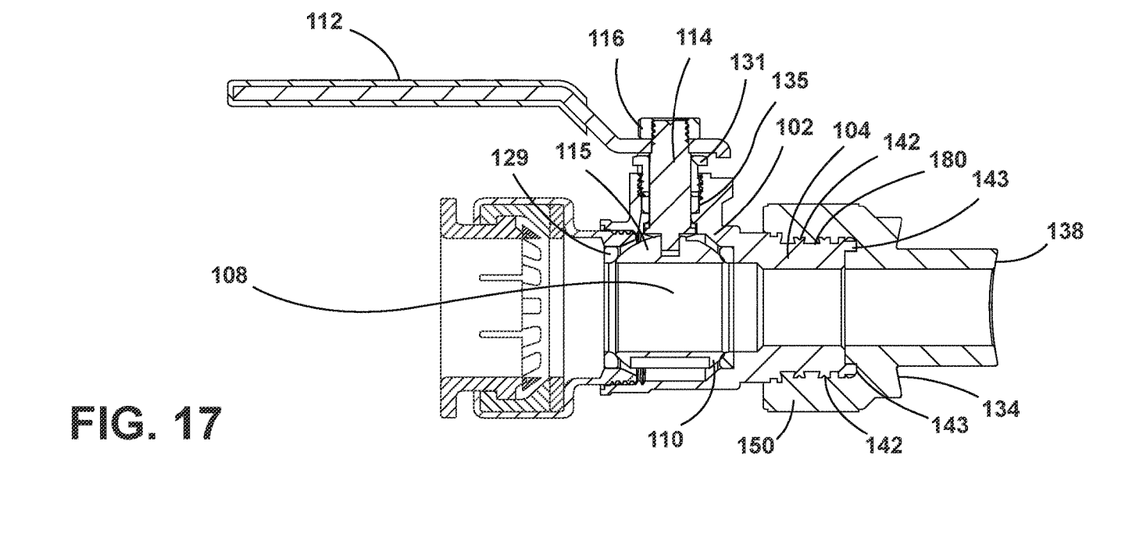
FIG. 17 is a cutaway side view of the isolation valve with the second port being a push-to-connect fitting.

In the illustrated embodiment, the second port 106 includes a press-fit coupling 120. The press-fit coupling 120 includes a groove 121 within which a seal 149, such as an O-ring, is included. When crimped, the press-fit coupling 120 can be easily coupled to tubing, including, but not limited to, copper tubing, other metal tubing, or polymeric tubing. The second port 106 can be any other type of coupling, including, but not limited to, a push-to-connect fitting (FIG. 17), a PEX fitting, a solder fitting, press-to-connect fitting, threaded connector, female NPT, male NPT, a bolted flange, a flange coupled to other fittings, etc. Additionally, the second port 106 can also be overmolded with a thermoplastic polymeric material (FIG. 16). This could include the second port 106, including an over-molded socket-style end. A drain or venting valve portion may extend from the valve body 102.

Figure 3:
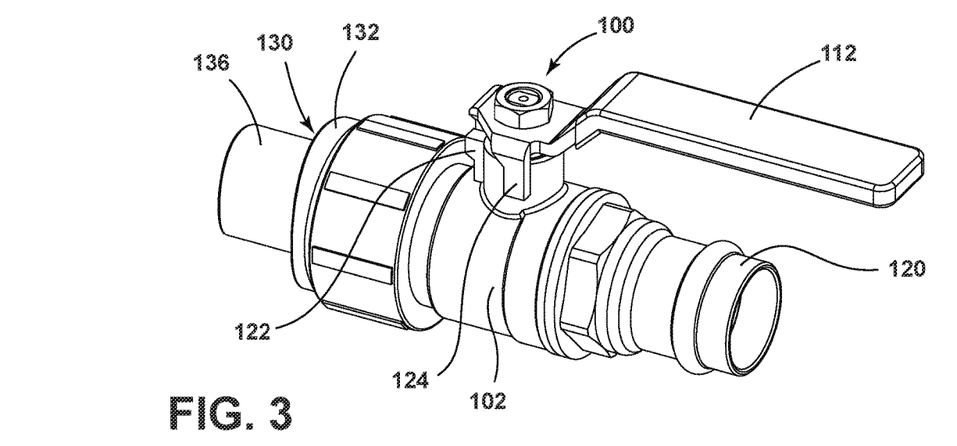
FIG. 3 is a perspective side view of one embodiment of an isolation valve embodying an aspect of the present invention.

While the illustrated embodiment of FIG. 3 shows a valve body 102 with two ports (104, 106), the valve body 102 can have three or more ports. In addition, the flow diversion device 110 can be an L- or T-ball depending upon the number and/or position of the ports. Any type of flow diversion device 110 can be used within the fluid passageway 108. In addition, the fluid passageway 108 can include more than one flow diversion device 110.

Figure 14:
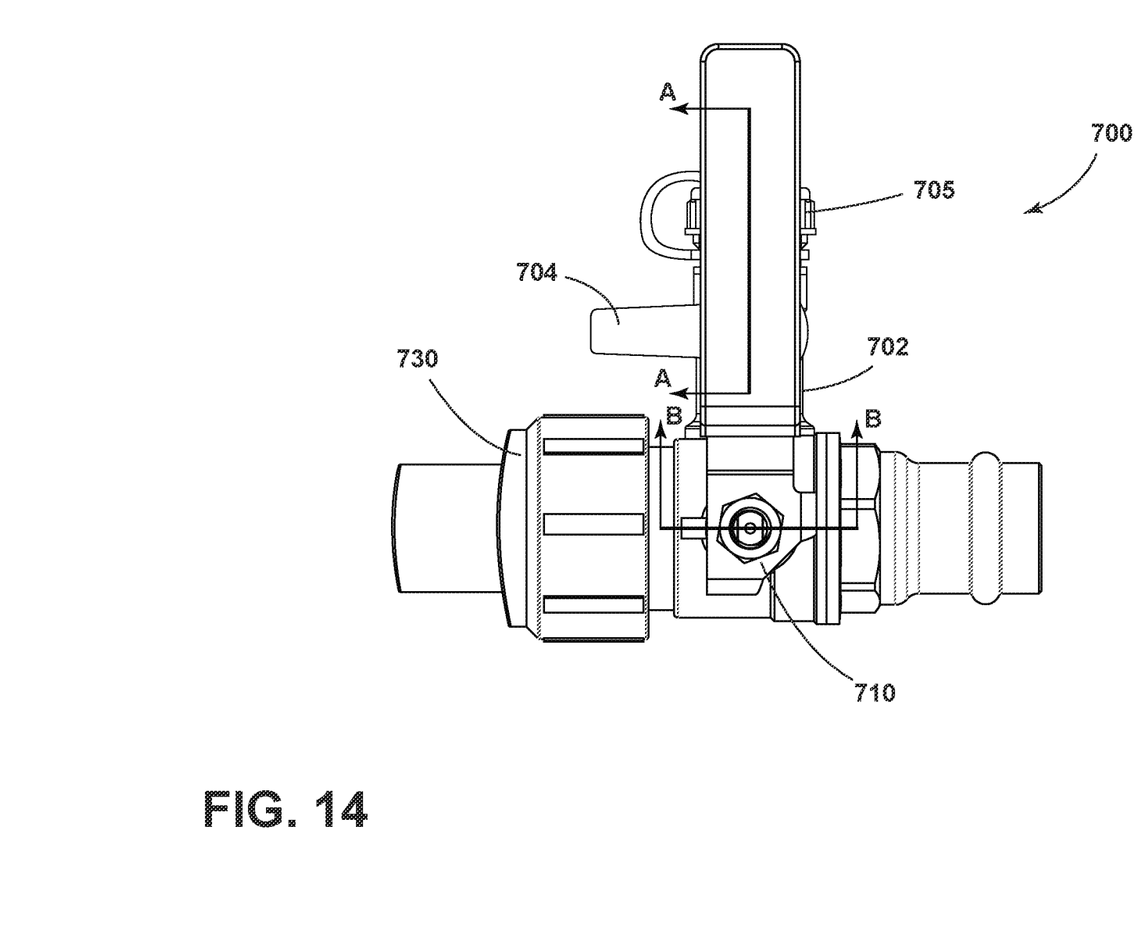
FIG. 14 is a top view of an isolation valve with a drain port.
Figure 15:
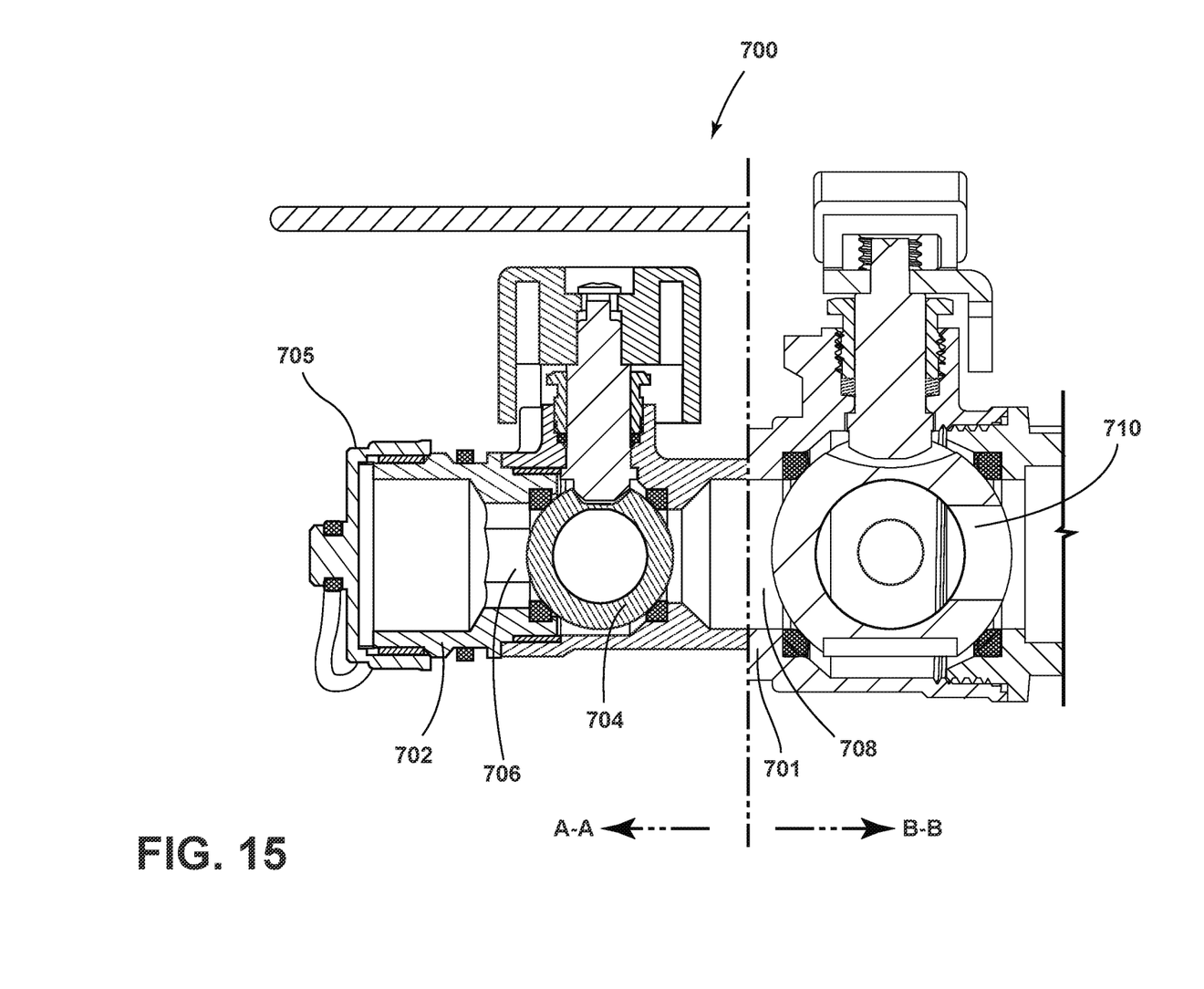
FIG. 15 is a partial cross-sectional side view of the isolation valve of FIG. 14, taken along line XV-XV as shown in FIG. 14.

Another embodiment of an isolation valve 700 is shown in FIGS. 14 and 15. The isolation valve 700 includes a drain port 702 with another valve 704 that permits the opening of the fluid passageway 706 to permit the isolation valve 700 to drain. The drain port 702 can include a cap 705. The isolation valve 700 includes a fusion outlet 730 that is similar to the fusion outlet 130 of isolation valve 100. The isolation valve 700 also includes a flow diversion device 710 that is similar to the flow diversion device 110 of isolation valve 100. The isolation valve 700 can be coupled to a polymeric pipe 170 in the same manner that isolation valve 100 is coupled to a polymeric pipe 170. The drain port 702 can be attached to the isolation valve body 701 or be integrally formed as part of isolation valve body 701. The drain port 702 can also be positioned in different arrangements on the isolation valve 700. The flow diversion device 710 can be a T-valve or other type of valve to permit the opening of the fluid passageway 708 to the drain port fluid passageway 706.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated. In addition, while certain embodiments have shown threaded connections, the threaded connections could include tape or other sealing material in the threaded connection. In addition, the threaded connection could be replaced by other suitable connections or couplings, such as compression couplings or other couplings.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the afore-mentioned structures and methods without departing from the concepts of the present invention, and further it is to be understood that such concepts are intended to be covered by the following claims unless these claims by their language expressly state otherwise.

The invention claimed is:

1. A fluid isolation valve with a multi-tiered fusion coupling, comprising:
   a metal valve body having a first port and a second port and defining a fluid passageway between said first port and said second port;
   an overmolded thermoplastic polymer end surrounding and enclosing a distal portion of one of said first and second ports;
   a ball disposed in the valve body between said first and second ports;
   wherein said distal portion of one of said first and second ports comprises at least one rib extending therefrom in a direction substantially parallel to a longitudinal axis of said one of first and second ports;
   wherein said at least one rib is configured to prevent said overmolded thermoplastic polymer end from rotating about the distal portion of said first or second port to which it is coupled; and
   wherein said overmolded thermoplastic polymer extends beyond said at least one rib to the multi-tiered fusion coupling, including a larger exterior diameter section with a concave surface and a smaller exterior diameter section, extending from the larger exterior diameter, with a concave surface.

2. The fluid isolation valve of claim 1, wherein said valve body is made of brass.

3. The fluid isolation valve of claim 1, wherein said at least one substantially parallel rib is a protrusion extending from a distal end of said one of said first and second ports.

4. The fluid isolation valve of claim 1, wherein said overmolded end comprises polypropylene random copolymer with modified crystallinity and temperature resistance (PP-RCT) material.

5. The fluid isolation valve of claim 1, wherein said smaller exterior diameter section is at a terminal end of the coupling and the larger exterior diameter section is located between the smaller diameter section and said overmolded rib section.

6. The fluid isolation valve of claim 1, wherein two immediately adjacent ribs form a channel in between, wherein the channel is configured to receive a portion of the overmolded thermoplastic polymer within.

7. A fluid isolation valve, comprising:
   a metal valve body having a first port, a second port, and a fluid passageway between said first port and said second port;
   an overmolded thermoplastic polymer end surrounding a distal portion of one of said first and second ports;
   a ball disposed in the valve body, between said first port and said second port;
   wherein the distal portion of said one of said first and second ports comprises at least one protrusion extending therefrom in a direction substantially parallel to a longitudinal axis of said one of the first and second ports, the at least one protrusion is configured to prevent the overmolded end from rotating about the distal portion of said one of the first and second ports; and
   wherein said overmolded thermoplastic polymer extends beyond said at least one protrusion to a coupling, with at least one tier having a larger exterior diameter section with a concave surface and a smaller diameter section, extending from the larger exterior diameter section, with a concave surface.

8. The fluid isolation valve of claim 7, wherein said valve body is made of brass.

9. The fluid isolation valve of claim 7, wherein said overmolded end comprises PP-R material.

10. The fluid isolation valve of claim 7, wherein said overmolded end comprises PP-RCT material.

11. The fluid isolation valve of claim 7, wherein said smaller exterior diameter section is at a terminal end of the coupling and the larger exterior diameter section is located between the smaller diameter section and said at least one protrusion.

12. A coupling of a fluid isolation valve to a polymeric pipe, comprising:
   the polymeric pipe with a generally cylindrical outer wall, having an opening in the generally cylindrical outer wall;
   a metal valve body having a first port, a second port, and a fluid passageway between said first port and said second port;
   an overmolded thermoplastic polymer end surrounding a distal portion of said first port;
   a ball disposed in the valve body, between said first port and said second port;
   wherein the distal portion of said first port comprises at least one protrusion extending therefrom in a direction substantially parallel to a longitudinal axis of said first port;
   wherein said overmolded thermoplastic polymer extends beyond said at least one protrusion to a coupling with at least one tier;
   wherein said at least one tier includes a larger exterior diameter section with a concave surface and a smaller exterior diameter section, extending from the larger exterior diameter section, with a concave surface; and
   wherein said concave surface of said larger exterior diameter section generally conforms to the generally cylindrical outer wall of said polymeric pipe when the fluid passageway of said metal valve body is aligned with said opening in said generally cylindrical outer wall of said polymeric pipe.

13. The coupling of a fluid isolation valve to a polymeric pipe of claim 12, wherein said concave surface is fused with said generally cylindrical outer wall by heat.

14. The coupling of a fluid isolation valve to a polymeric pipe of claim 12, wherein the overmolded thermoplastic polymer is a PP-RCT material.

15. The coupling of a fluid isolation valve to a polymeric pipe of claim 12, wherein the valve is made of brass.

16. The coupling of a fluid isolation valve to a polymeric pipe of claim 12, wherein the at least one protrusion includes two immediately adjacent protrusions forming a channel in between, wherein the channel is configured to receive a portion of the overmolded thermoplastic polymer within.

17. The coupling of a fluid isolation valve to a polymeric pipe of claim 12, wherein said second port is a press-fit coupling.

18. The coupling of a fluid isolation valve to a polymeric pipe of claim 12, wherein said second port is a push-to-connect fitting.

19. The coupling of a fluid isolation valve to a polymeric pipe of claim 12, wherein said second port also includes an overmolded thermoplastic polymer section.

* * * * *